US012366709B2

United States Patent
Liscidini et al.

(10) Patent No.: US 12,366,709 B2
(45) Date of Patent: Jul. 22, 2025

(54) RESONANT INTERFEROMETRIC COUPLER AND METHOD OF MODIFYING AN OPTICAL SIGNAL USING SAME

(71) Applicant: XANADU QUANTUM TECHNOLOGIES INC., Toronto (CA)

(72) Inventors: Marco Liscidini, Pavia (IT); Matteo Menotti, Toronto (CA); Zachary Vernon, Toronto (CA); Alice Viola, Alagna (IT)

(73) Assignee: XANADU QUANTUM TECHNOLOGIES INC.

( * ) Notice: Subject to any disclaimer, the term of this patent is extended or adjusted under 35 U.S.C. 154(b) by 286 days.

(21) Appl. No.: 18/324,572

(22) Filed: May 26, 2023

(65) Prior Publication Data
US 2023/0384523 A1 Nov. 30, 2023

Related U.S. Application Data

(60) Provisional application No. 63/346,930, filed on May 30, 2022.

(51) Int. Cl.
*G02B 6/293* (2006.01)
*G02F 1/01* (2006.01)
(Continued)

(52) U.S. Cl.
CPC ..... *G02B 6/29338* (2013.01); *G02B 6/29352* (2013.01); *G02B 6/29395* (2013.01);
(Continued)

(58) Field of Classification Search
CPC ............ G02B 6/12007; G02B 6/29338; G02B 6/29352; G02B 6/29395; G02F 1/0147; G02F 1/225; G02F 2203/56
See application file for complete search history.

(56) References Cited

U.S. PATENT DOCUMENTS 7,171,076 B2 * 1/2007 Shibata ............ H04B 10/25133
385/32
8,064,490 B2 * 11/2011 Okayama ........... G02B 6/29355
372/6
(Continued)

FOREIGN PATENT DOCUMENTS

EP            4286924 A1    12/2023

OTHER PUBLICATIONS

Daoxin Dai and John E. Browers, Silicon-based on-chip multiplexing technologies and devices for peta-bit optical interconnects, Nov. 14, 2013, Nanophotonics 2014; (4-5): 283-311, De Gruyter.
(Continued)

*Primary Examiner* — Ryan A Lepisto
(74) *Attorney, Agent, or Firm* — Reno Lessard; Norton Rose Fulbright Canada LLP (57) ABSTRACT

There is described a resonant interferometric coupler generally having: a substrate; a bus waveguide having in serial connection an input section, a bent section and an output section; a first resonator having a first evanescent coupling point with the input section and a second evanescent coupling point with the output section, the first resonator having first resonances; an interferometer having a first arm path extending along the bent section between the first and second evanescent coupling points, and a second arm path extending along the first resonator between the first and second evanescent coupling points; and a second resonator having a third evanescent coupling point with the bent section, the second resonator having a second resonance overlapping with one of the first resonances and across which a first phase shift is imparted, thereby causing interference at the second evanescent coupling point.

20 Claims, 6 Drawing Sheets

(51) Int. Cl.
*G02F 1/225* (2006.01)
*G02B 6/12* (2006.01)

(52) U.S. Cl.
CPC ............ *G02F 1/0147* (2013.01); *G02F 1/225* (2013.01); *G02B 6/12007* (2013.01); *G02F 2203/56* (2013.01)

(56) References Cited

U.S. PATENT DOCUMENTS

| | | | | |
|---|---|---|---|---|
| 8,340,478 | B2* | 12/2012 | Popovic | G02B 6/12007 |
| | | | | 385/32 |
| 8,467,122 | B2* | 6/2013 | Zheng | H01S 5/142 |
| | | | | 359/344 |
| 9,176,280 | B2* | 11/2015 | Li | H01S 5/02326 |
| 9,798,219 | B2* | 10/2017 | Pant | G02F 1/39 |
| 10,033,478 | B2* | 7/2018 | Lipson | H04J 14/0307 |
| 10,158,481 | B2* | 12/2018 | Bunandar | H04L 9/0852 |
| 10,312,387 | B2* | 6/2019 | Englund | H10F 77/12485 |
| 10,359,568 | B2* | 7/2019 | Hu | G02B 6/126 |
| 10,372,014 | B1* | 8/2019 | Vidrighin | G02F 1/3536 |
| 10,386,698 | B2* | 8/2019 | Santori | G02F 1/3521 |
| 10,547,406 | B2* | 1/2020 | Akiyama | G02B 6/12007 |
| 10,649,307 | B2 | 5/2020 | Vernon et al. | |
| 10,656,012 | B2* | 5/2020 | Atabaki | G01J 3/2803 |
| 10,809,592 | B2 | 10/2020 | Dutt et al. | |
| 11,092,875 | B2* | 8/2021 | Xu | G02F 1/365 |
| 11,237,454 | B2* | 2/2022 | Carolan | H01S 3/094096 |
| 11,556,046 | B2* | 1/2023 | Heuck | G02F 3/00 |
| 11,561,347 | B2* | 1/2023 | Bhargava | G02B 6/272 |
| 2014/0133511 | A1* | 5/2014 | Tanaka | H01S 5/1032 |
| | | | | 372/50.22 |
| 2015/0016767 | A1* | 1/2015 | Akiyama | G02F 1/225 |
| | | | | 385/3 |
| 2018/0335570 | A1* | 11/2018 | Fanto | G02F 1/3132 |
| 2023/0113820 | A1* | 4/2023 | Canoglu | H01S 5/0014 |
| | | | | 356/4.01 |
| 2023/0333441 | A1* | 10/2023 | Luan | G02F 1/0305 |

OTHER PUBLICATIONS

Vernon & al., Truly unentangled photon pairs without spectral filtering, Optic Letters, Sep. 15, 2017.
M. Gentry 7 al., Tailoring of Individual Photon Lifetimes as a Degree of Freedom in Resonant Quantum Photonic Sources, 2016.
Zhang & al., Squeezed light from a nanophotonic molecule, Nature Communications, Apr. 14, 2021.
Zhang & al,, Tunable Optical Ring Resonator Integrated With Asymmetric Mach-Zehnder Interferometer, Journal of Lightwave Technology.

* cited by examiner

RESONANT INTERFEROMETRIC COUPLER AND METHOD OF MODIFYING AN OPTICAL SIGNAL USING SAME

FIELD

The improvements generally relate to photonic chips and more particularly to resonant interferometric couplers.

BACKGROUND

In a manner analogous to electronic chips providing functions for electronic signals, photonic chips provide functions for optical signals. Optical signals are broadly defined as electromagnetic signals ranging in the visible region or in the near-infrared region of the electromagnetic spectrum, for instance. Photonic chips typically have one or more waveguide(s) running atop a substrate with one or more photonic component(s) interconnected between the waveguide(s).

In some applications, photonic chips configured to enhance or suppress the electromagnetic field (or optical power) within a given spectral range are highly desirable. To do so, the photonic component can be provided in the form of an interferometer such as a Mach-Zehnder interferometer (MZI). A MZI splits an input waveguide into two separate waveguides, typically referred as arm paths, which are then recombined into an output waveguide. Differences in the propagation parameters along the two arm paths, such as a length difference, can induce a relative phase shift which can in turn lead to constructive or destructive interference where the two arm paths are recombined. As a MZI can lead to field enhancement in the case of constructive interference, it can also lead to field suppression in the case of destruction interference. However, field enhancement or suppression obtained through a MZI is not necessarily limited to a given spectral range.

Other photonic components acting as band-pass filters can limit the field enhancement or suppression to the given spectral range. Examples of such band-pass filters can include, but are not limited to, resonators such as ring resonators. When such a ring resonator is evanescently coupled to a waveguide carrying an optical signal, optical power ranging within a resonant spectral range of the ring resonator is allowed to build up over multiple round trips due to constructive interference and total internal reflection occurring within the ring resonator. The optical power buildup can lead to field enhancement only within the resonant spectral range, which can be significantly narrow in some applications. The narrowness and/or spectral position of the resonant spectral range can be modified based on the materials of the waveguide and of the ring resonator, or on a distance between the waveguide and the ring resonator, to name only a few examples.

Although existing photonic chips enhancing or suppressing field within a given spectral range are satisfactory to a certain degree, there remains room for improvement.

SUMMARY

There is described a resonant interferometric coupler which is configured for enhancing or suppressing field within a specific spectral width. Broadly described, the resonant interferometric coupler has a bus waveguide carrying an optical signal having optical power spanning across a given spectral range. The bus waveguide has an input section through which the optical signal is received, a bent section and an output section serially connected to one another. The resonant interferometric coupler has a first resonator having a first evanescent coupling point with the input section and a second evanescent coupling point with the output section. The first resonator has first resonances at least partially overlapping the given spectral range of the optical signal. As such, field enhancement is allowed to occur within the first resonator for optical power being distributed within the first resonances. An interferometer is also provided. The interferometer has a first arm path extending along the bent section between the first and second evanescent coupling points and a second arm path extending along the first resonator between the first and second evanescent coupling points. In this way, the field enhancement occurring within the first resonator, i.e., along the second arm path, is also fed to the first arm path by way of the first coupling point and the rotary nature of the first resonator, which can further benefit field manipulation. The resonant interferometric coupler also has a second resonator having a third evanescent coupling point with the bent section. The second resonator has a second resonance overlapping with at least one of the first resonances and across which a phase shift is imparted. The phase shift imparted by the second resonator can cause interference at the second evanescent coupling point where the first and second arm paths are recombined to one another. In this way, field enhancement or suppression can be designed to occur over a very specific spectral range based on the design of the first and second resonators, thereby allowing for selective resonant control of the quality factor of one or more resonances of the first and second resonators. In some embodiments, a tuning mechanism acting on the second resonator can be used to modify (e.g., move, narrow, broaden) the second resonance(s) of the second resonator.

In accordance with a first aspect of the present disclosure, there is provided a resonant interferometric coupler comprising: a substrate; a bus waveguide mounted to the substrate, the bus waveguide having in serial connection an input section, a bent section and an output section; a first resonator mounted to the substrate and having a first evanescent coupling point with the input section and a second evanescent coupling point with the output section, the first resonator having first resonances; an interferometer having a first arm path extending along the bent section between the first and second evanescent coupling points, and a second arm path extending along the first resonator between the first and second evanescent coupling points; and a second resonator being mounted to the substrate and having a third evanescent coupling point with the bent section, the second resonator having at least a second resonance overlapping with at least one of the first resonances and across which a first phase shift is imparted, the first phase shift causing interference at the second evanescent coupling point.

Further in accordance with the first aspect of the present disclosure, the resonant interferometric coupler can for example comprise a tuning mechanism mounted to the substrate, the tuning mechanism being operable to modify the second resonance of the second resonator.

Still further in accordance with the first aspect of the present disclosure, the tuning mechanism can for example include a heater configured for heating at least an area of the second resonator.

Still further in accordance with the first aspect of the present disclosure, the resonant interferometric coupler can for example comprise a thermal barrier thermally insulating the first and second resonators from one another.

Still further in accordance with the first aspect of the present disclosure, the resonant interferometric coupler can for example comprise at least a third resonator mounted to the substrate and adjacent to the second resonator, the third resonator having at least a fourth coupling point with the bent section and at least a third resonance overlapping with at least one of the first resonances and across which a second phase shift is imparted.

Still further in accordance with the first aspect of the present disclosure, the third resonance can for example be spectrally spaced apart from the second resonance.

Still further in accordance with the first aspect of the present disclosure, the second resonator can for example have a fourth coupling point with the bent section downstream from the third coupling point.

Still further in accordance with the first aspect of the present disclosure, at least one of the first resonator and the second resonator can for example be a ring resonator.

Still further in accordance with the first aspect of the present disclosure, the second resonance can for example be twice as broad as the one of the first resonances.

Still further in accordance with the first aspect of the present disclosure, the substrate can for example be made of silicon, the bus waveguide can consist of one of silicon-oxide and silicon-nitride, and the second resonance can have a full width at half maximum of about 2 nm.

Still further in accordance with the first aspect of the present disclosure, the first phase shift imparted by the second resonator can for example be frequency dependent.

In accordance with a second aspect of the present disclosure, there is provided a method of modifying an optical signal using a resonant interferometric coupler, the resonant interferometric coupler having a bus waveguide having in serial connection an input section, a bent section and an output section, a first resonator being evanescently coupled with the input section at a first coupling point and evanescently coupled with the output section at a second coupling point, an interferometer having a first arm path extending along the bent section between the first and second coupling points, and a second arm path extending along the first resonator between the first and second coupling points, the method comprising: splitting an optical signal into a first optical signal portion propagated along the first arm path and a second optical signal portion propagated along the second arm path; the second optical signal resonating within the first resonator at first resonances of the first resonator; using a second resonator being evanescently coupled to the bent section at a third coupling point, imparting a first phase shift to the first optical signal portion across at least a second resonance at least partially overlapping with one of the first resonances; and at the second coupling point downstream from the third coupling point, coupling the first and second optical signal portions to one another, the first phase shift causing interference at least for the second resonance; and outputting an output optical signal modified by said interference at the output waveguide.

Further in accordance with the second aspect of the present disclosure, the method can for example comprise tuning the second resonance of the second resonator.

Still further in accordance with the second aspect of the present disclosure, said tuning can for example include at least one of spectrally shifting the second resonance, narrowing the second resonance and broadening the second resonance.

Still further in accordance with the second aspect of the present disclosure, said tuning can for example include heating at least an area of the second resonator.

Still further in accordance with the second aspect of the present disclosure, said tuning can for example include modifying a refractive index of the second resonator.

Still further in accordance with the second aspect of the present disclosure, the method can for example comprise thermally insulating the first and second resonators from one another.

Still further in accordance with the second aspect of the present disclosure, the second resonance can for example be twice as broad as the one of the first resonances.

Still further in accordance with the second aspect of the present disclosure, the optical signal can for example have optical power distribution within a telecommunication band, and the second resonance can have a full width at half maximum of about 2 nm.

Still further in accordance with the second aspect of the present disclosure, the first phase shift imparted by the second resonator can for example be frequency dependent.

All technical implementation details and advantages described with respect to a particular aspect of the present invention are self-evidently mutatis mutandis applicable for all other aspects of the present invention.

Many further features and combinations thereof concerning the present improvements will appear to those skilled in the art following a reading of the instant disclosure.

DESCRIPTION OF THE FIGURES

In the figures.

DETAILED DESCRIPTION

This disclosure describes a resonant interferometric coupler configured to control an effective linear coupling between a first resonator and a bus waveguide. When an optical signal travels through the first resonator, it undergoes a phase shift that ranges from 0 to $2\pi$ across one or more of its resonances. This effect is exploited using an interferometer to realize an effective coupler between the first resonator and the bus waveguide with the coupling efficiency being controlled over a specific frequency range by means of a second resonator. By changing the effective coupling efficiency, the quality factor of a selected resonance can be increased or decreased to enhance or suppress any light-matter interaction taking place at that resonance. The resonant interferometric coupler can thus enable the control of a spectral position and/or a quality factor of one or more of its resonances. By controlling its resonances, the strength of any nonlinear interaction(s) can be enhanced at these resonances. Since field enhancement at each resonance depends on a resonator size and associated energy dissipation rate, which is inversely proportional to the mode quality factor, the control of such properties is desired to enhance desired nonlinear processes while suppressing unwanted spurious effects. These nonlinear processes can include, but are not limited to, parametric fluorescence, four-wave mixing, Raman scattering, fluorescence, squeezed light and the like. As described below, the resonant interferometric coupler can control of the quality factor of individual resonance(s) without affecting the other resonances of the resonators, offer dynamic tunability after fabrication, reduce thermal cross talk in the case of heaters that are used as tuning elements, provide scalability to control multiple resonances and also provide broad compatibility in terms of material platforms and wavelength ranges.

Figure 1:
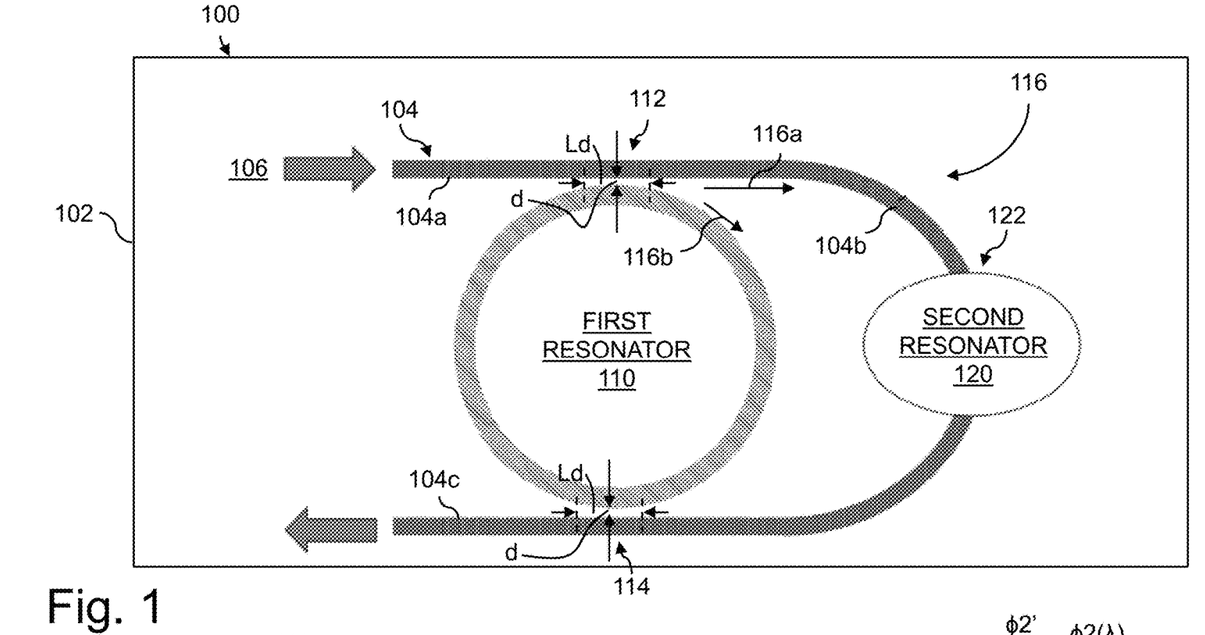
FIG. 1 is a schematic view of a first example of a resonant interferometric coupler for modifying an optical signal, shown with first and second resonators coupled with one another via an interferometer, the first and second resonators having respective first and second resonances, in accordance with one or more embodiments.

FIG. 1 shows an example of such a resonant interferometric coupler 100. As depicted, the resonant interferometric coupler 100 has a substrate 102 and a bus waveguide 104 mounted to the substrate 102. The substrate 102 can be any suitable type of substrate which can act as a photonic wafer. Examples of photonic wafers can include, but are not limited to, silicon wafers, silicon nitride wafers, zinc oxide wafers, aluminum nitride wafers, indium gallium wafers, gallium arsenide wafers, gallium nitride wafers, silicon carbide wafers, lithium niobate wafers, barium titanate oxide wafers, lithium tantalite wafers, langasite wafers, germanium wafers, germanium on silicon wafers, other III-V semiconductors wafers, or any other optical wafers which may be used in the telecommunications and photonic-integrated circuit industries. In some embodiments, the resonant interferometric coupler 100 has one or more cap layers deposited atop the bus waveguide 104 and the remainder of the substrate 102.

As shown, the bus waveguide 104 has in serial connection an input section 104a, a bent section 104b and an output section 104c. In some embodiments, the bus waveguide 104 can run atop the substrate 102. In some other embodiments, the bus waveguide 104 can be wholly or partially buried within the substrate 102. Typically, the bus waveguide 104 is a strip waveguide. However, the bus waveguide 104 can be any type of waveguide including, but not limited to, a rib waveguide, a segmented waveguide, a photonic crystal waveguide, a triangular-shaped waveguide, an optical fiber waveguide and the like.

Figure 1A:
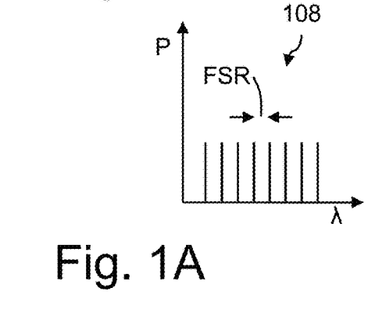
FIG. 1A is a graph showing an example of a given spectral range of the optical signal of FIG. 1, in accordance with one or more embodiments.

The bus waveguide 104 is configured for receiving an optical signal 106 at the input section 104a, which is then propagated to the output section 104c via the bent section 104b. In some embodiments, the optical signal 106 can be a frequency comb 108 having a given free spectral range FSR such as illustrated in FIG. 1A. The optical signal 106 can be of any type of coherent light distributed within the visible region, the near-infrared region, the mid-infrared region and/or the far-infrared region of the electromagnetic spectrum. Typically, the optical signal 106 can be within some telecommunication bands including, but not limited to, the original band (e.g., 1260-1360 nm), the extended band (e.g., 1360-1460 nm), the short wavelength band (e.g., 1460-1530 nm), the conventional band (e.g., 1530-1565 nm), the long-wavelength band (e.g., 1565-1625 nm), the ultra-long wavelength band (e.g., 1625-1675 nm) and the like.

The resonant interferometric coupler 100 has a first resonator 110 mounted to the substrate 102. In the illustrated embodiment, the first resonator 110 is provided in the form of a race-track ring resonator. In practice, ring resonators may be preferred over other types of resonators as they are easier to manufacture. However, in some other embodiments, the first resonator 110 can be provided in the form of a photonic crystal ring resonator, a traditional total internal reflection (TIR) resonator, a whispering-gallery mode resonator, and the like. Nonlinear interactions may take place inside the first resonator 110. Accordingly, the first resonator 110 may preferably be made of material which can sustain high intensities and/or materials which exhibit strong nonlinear optical susceptibility.

As shown, the first resonator 110 has a first evanescent coupling point 112 with the input section 104a and a second evanescent coupling point 114 with the output section 104c. The optical coupling between the bus waveguide 104 and the first resonator 110 is made through the evanescent field of the optical signal 106, which extends outside of the bus waveguide 104 in an exponentially decreasing radial profile. As the first resonator 110 and the bus waveguide 104 are brought closely together at the first or second evanescent coupling point 112,114, optical power from the bus waveguide 104 can couple into the first resonator 110, or vice versa. There can be three factors that affect such an evanescent coupling: i) the distance d between the bus waveguide 104 and the first resonator 110, ii) the coupling length Ld and iii) the refractive indices of the bus waveguide 104 and the first resonator 110. To optimize the coupling, narrowing the distance d between the first resonator 110 and the bus waveguide 104 is usually preferred.

In this embodiment, the bent section 104b has a C- or U-shaped waveguide section having a first bent section extending away from the first resonator 110 and a second bent section extending back towards the first resonator 110. When the optical signal 106 is inputted at the input section 104a of the bus waveguide 104, a first portion of the optical signal (hereinafter "first optical signal portion") is propagated towards the bent section 104b of the bus waveguide 104 whereas a second portion of the optical signal (hereinafter "second optical signal portion") is coupled into the first resonator 110.

Figure 1B:
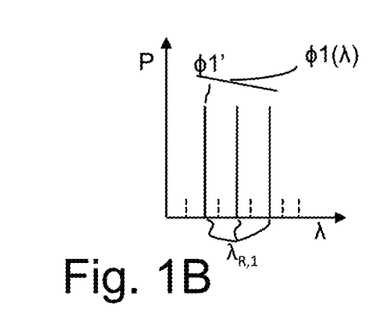
FIG. 1B is a graph showing exemplary first resonances of the first resonator of FIG. 1, in accordance with one or more embodiments.

Due to its shape, size, refractive index and other parameters, the first resonator 110 has one or more first resonances, hereinafter referred to as first resonant wavelengths $\lambda_{R,1}$. The first resonant wavelengths $\lambda_{R,1}$, and any other resonances referred to herein, include one or more wavelengths (or frequencies) of the optical signal 106 that resonate within the corresponding resonator. In some embodiments, in order for light to interfere constructively inside the first resonator 110 and create a resonant effect, the circumference or effective length of the first resonator 110 must be an integer multiple of the wavelength of the optical signal 106. As such, only given wavelengths allow resonance to take place within the first resonator 110. As a result, when the optical signal 106 contains multiple wavelengths (e.g., white light), only the first resonant wavelengths $\lambda_{R,1}$ are able to pass through the first resonator 110 fully. It is noted that as the circumference or effective length of the first resonator 110 can dictate which wavelengths are resonant, the first resonances can be selected through construction parameters (e.g., shape, diameter, circumference) of the first resonator 110. The optical power distributed at resonance builds up over a number of round trips, resulting in field enhancement for these resonant wavelengths. Examples of first resonances are shown in FIG. 1B. As depicted, some wavelengths of the optical signal are resonant as they exhibit higher optical power than wavelengths outside the first resonances. Typically, wavelengths outside the first resonances are not able to bounce within the first resonator 110 and tend to leak outside the first resonator 110, which may cause optical losses at these wavelengths. The first resonator 110 may impart a first phase shift φ1 to the first resonant wavelengths $\lambda_{R,1}$. The first phase shift φ1 may range between 0 and $\lambda_{R,1}$ radians in some embodiments. The phase shift φ1 may be a wavelength-dependent (or frequency-dependent) phase shift $\lambda_{(\lambda)}$ in some embodiments. As such, each one of the first resonant wavelengths $\lambda_{R,1}$ may be imparted a respective first phase shift φ1' by resonating within the first resonator.

Referring back to FIG. 1, the resonant interferometric coupler 100 has an interferometer 116 which can be of the Mach-Zehnder type. As shown, the interferometer 116 has a first arm path 116a extending along the bent section 104b between the first and second evanescent coupling points 112 and 114 and a second arm path 116b extending along the first resonator 110 between the first and second evanescent coupling points 112 and 114. Accordingly, the first optical signal portion is propagated along the first arm path 116a whereas the second optical signal portion is propagated along the second arm path 116b. As discussed above, the second optical signal portion does round trips within the first resonator 110 which can enhance optical power distributed at the first resonant wavelengths $\lambda_{R,1}$. The second optical signal is simultaneously and continuously delivered into the output section 104c via the second evanescent coupling point 114 but also into the bent section 104b via the first evanescent coupling point 112 due to the rotary nature of the first resonator 110.

In some embodiments, a length difference between the first and second arm paths 116a and 116b creates a relative phase shift between the first optical signal portion propagating along the first arm path 116a and the second optical signal portion propagating along the second arm path 116b. In some embodiments, this length-induced relative phase-shift can create constructive or destructive interference where the optical signal portions are recombined to one another at the second evanescent coupling point 114. In some embodiments, the length difference between the first and second arm paths 116a and 116b may be designed to favour constructive or destructive interference, depending on the application.

As such a length-induced relative phase shift can provide field enhancement or suppression, it may not be limited to a certain spectral range. As illustrated, the resonant interferometric coupler 100 is provided with a second resonator 120 mounted to the substrate 102. More specifically, the second resonator 120 has a third evanescent coupling point 122 with the bent section 104b. The second resonator 120 can be provided in the form of a race-track ring resonator, a photonic crystal ring resonator, a TIR resonator, a whispering-gallery mode resonator, and the like.

Figure 1C:
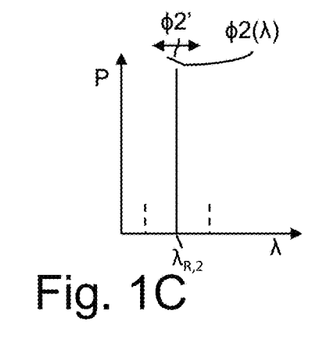
FIG. 1C is a graph showing an example of a second resonance of the second resonator of FIG. 1, in accordance with one or more embodiments.

As shown in FIG. 10, the second resonator 120 has one or more second resonances overlapping with at least one of the first resonances and across which a second phase shift φ2 is imparted. This can be obtained by selecting proper lengths for the first and second resonators 110 and 120. This can be achieved by choosing the lengths of the first and second resonator 110 and 120 to be commensurable, e.g., the length of the second resonator 120 being ¾ of the length of the first resonators 110. Typical lengths of the first resonator 110 depends on the operational wavelength range, in the telecom bandwidth they can be of the order of a few hundreds of micrometres or longer. In some embodiments, the length of the bent waveguide 104b extending between the first and second evanescent coupling points 112 and 114 is set to achieve a desired coupling efficiency of the first resonances that are to be unaffected by the second resonator 120, i.e., the first resonances which do not overlap with the second resonances. When the field is in resonance with both the first and second resonators 110 and 120, it undergoes an additional phase shift, i.e., the second phase shift φ2. Since the second phase shift φ2 can range from 0 to 2π, complete control over the interference of the interferometer can be provided, which can in turn result in an increase or a decrease of the coupling efficiency of the first resonator 110 to the bus waveguide 104 at the second evanescent coupling point 114.

As such, second resonant wavelength(s) $\lambda_{R,2}$ correspond(s) to some of the first resonant wavelengths $\lambda_{R,1}$. As shown, the second phase shift φ2 may be a wavelength-dependent (or frequency-dependent) phase shift φ2(λ) in some embodiments. Each second resonant wavelength(s) may be imparted a respective second phase shift φ2' by resonating within the second resonator 120. It is noted that the second phase shift φ2 which is selectively imparted on the second resonant wavelength(s) leads to interference at the second evanescent coupling point 114 where the first and second resonances are recombined to one another at the output section 104c. For instance, if the first phase shift φ1' imparted by the first resonator 110 on a given resonant wavelength is 0 or 2π and the second phase shift φ2' imparted by the second resonator 120 on the given resonant wavelength is 0 or 2π, then constructive interference at the given resonant wavelength can occur at the second evanescent coupling point 114. If the first phase shift φ1' imparted by the first resonator 110 on a given resonant wavelength is 0 or 2π and the second phase shift φ2' imparted by the second resonator 120 on the given resonant wavelength is π, then destructive interference at the given resonant wavelength can occur at the second evanescent coupling point 114.

In some embodiments, the size, shape, refractive index and other parameters of the first and second resonators 110 and 120 are collectively designed to promote constructive or destructive interference for a single resonance or for a set of specific resonances. In some embodiments, the second resonance is twice as broad as the one of the first resonances, preferably five times as broad as the one of the first resonances and most preferably ten times as broad as the one of the first resonances. In some other embodiments, the second resonance is twice as narrow as the first resonance, preferably five times as narrow as the first resonance and most preferably ten times as narrow as the first resonance. In embodiments where the substrate is silicon, the waveguides are composed of silicon-oxide or silicon-nitride, and the desired wavelengths are distributed in the telecoms band, the first and second resonances can have a full width at half maximum of about 10 nm, preferably about 5 nm and most preferably about 2 nm. It is noted that these values can vary depending on the embodiment. For instance, the absolute values of the first and second resonances' widths can vary depending on the material platform and wavelength of the optical signal. It is intended that by using a second resonator 120 instead of a broadband phase shifting device, a phase shift can be imparted on a significantly narrower bandwidth, which can provide significant advantages. Accordingly, the construction of the resonant interferometric coupler 100 can be carefully designed to select wavelengths at which field enhancement or suppression can occur.

Figures 2, 2A:
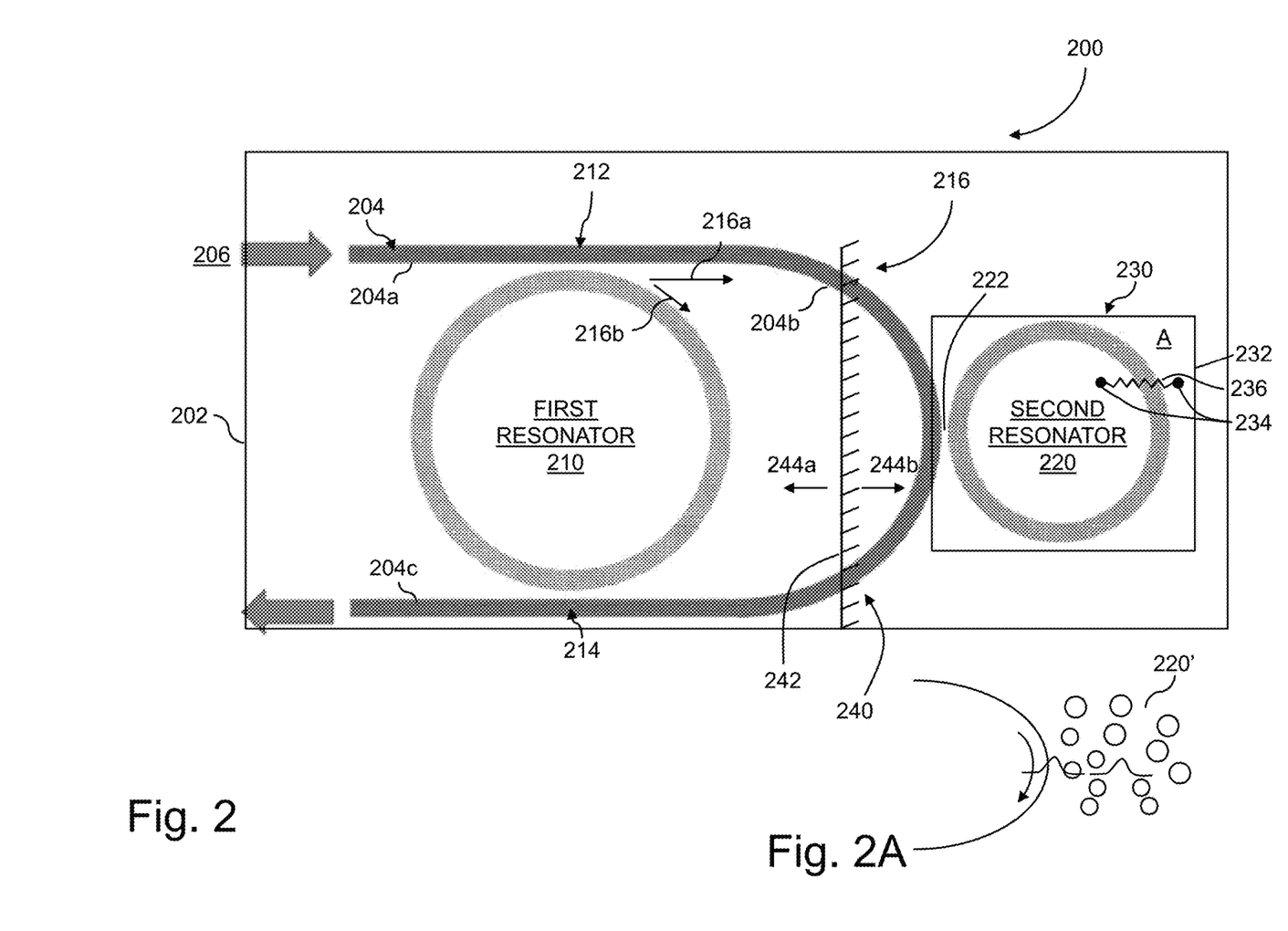
FIG. 2 is a schematic view of a second example of a resonant interferometric coupler, shown with a ring resonator as the second resonator, in accordance with one or more embodiments.
FIG. 2A is a schematic view of a micro-cavity resonator acting as the second resonator, in accordance with one or more embodiments.

FIG. 2 shows another example of a resonant interferometric coupler 200 for modifying an optical signal 206. In this embodiment, the resonant interferometric coupler 200 has a substrate 202, and a bus waveguide 204 mounted to the substrate 202. The bus waveguide 204 has in serial connection an input section 204a, a bent section 204b and an output section 204c. A first resonator 210 is mounted to the substrate 202. As shown, the first resonator 210 has a first evanescent coupling point 212 with the input section 204a and a second evanescent coupling point 214 with the output section 204c. The resonant interferometric coupler 200 has an interferometer 216 having a first arm path 216a extending along the bent section 204b and a second arm path 216b extending along the first resonator 210 between the first and second evanescent coupling points 212 and 214. A second resonator 220 is mounted to the substrate 202. As shown, the second resonator 220 has a third evanescent coupling point 222 with the bent section 204b. In this specific embodiment, both the first resonator 210 and the second resonator 220 are provided in the form of a ring resonator of a circular shape. The first and second resonators 210 and 220 can differ in size, shape, refractive index or other parameters so as to provide different resonances. Preferably, the lengths, sizes and shapes of the first and second resonators 210 and 220 are selected to provide desired first and second resonances. Moreover, the length of the bent waveguide 204b extending between the first and second evanescent coupling points 212 and 214 is set to achieve a desired coupling efficiency of the first resonances that are to be unaffected by the second resonator 220. More specifically, in this example, the first resonator 210 has first resonances whereas the second resonator 220 has at least a second resonance overlapping at least partially with one of the first resonances. FIG. 2A shows another example where the second resonator 220 is provided in the form of a photonic crystal ring resonator 220' instead of a ring resonator. In this example, the second resonance may be defined by the spacing distances between the microcavities, for instance.

Referring back to FIG. 2, the resonant interferometric coupler 200 has a tuning mechanism 230 mounted to the substrate 202. The tuning mechanism 230 is operable to modify the second resonance of the second resonator 220 as desired. It was found that although the manufacturing of the resonant interferometric coupler 200 can be made with great precision and accuracy, difference in tolerances can play a significant role in obtaining a second resonator 220 having the desired second resonance. Accordingly, by using the tuning mechanism 230, the second resonance can be modified as desired post-fabrication at any time during the life of the resonant interferometer coupler 200. The tuning mechanism 230 can be used to modify the second resonance dynamically as a function of time. Fabrication defects or temperature drifts, to name only a few examples, can thus be compensated by operating the tuning mechanism, thereby adding flexibility and enabling scalability.

In some embodiments, the tuning mechanism 230 can be configured to spectrally move, narrow or broaden the second resonance as desired. For instance, the tuning mechanism 230 can include a heater 232 configured for heating at least an area A of the second resonator 220 which can in turn modify the second resonator's size, shape, refractive index, or a combination thereof. The heater 232 can be provided in the form of two or more electrical contacts 234 propagating an electric signal across a resistive region 236 proximate to the second resonator 220. The resistive region 236 can include a resistive element or simply a portion of the substrate depending on the embodiment. As shown in this embodiment, the first and second resonators 210 and 220 are thermally insulated from one another using a thermal barrier 240. The thermal barrier 240 can prevent the heat generated by the heater from modifying the first resonances of the first resonator 210 in addition to the second resonance of the second resonator 220. In other words, the thermal barrier 240 can prevent thermal crosstalk between the first and second resonators 210 and 220. In some embodiments, the thermal barrier 240 is provided in the form of a first wall 242 partition defining on one side a first chamber 244a encompassing the first resonator 210 and on an opposing side a second chamber 244b encompassing the second resonator 220. In some embodiments, the thermal barrier is provided in the form of a spacing distance separating the first and second resonators 210 and 220 from one another. In these embodiments, air filling the spacing distance can act as the thermal barrier 240. In these latter embodiments, partitions such as the first wall 242 and other thermally insulating elements can be omitted. When the first and second chambers 210 and 220 are thermally insulated from one another, heat generated by the heater 232 proximate to the second resonator 220 may not interfere with the temperature proximate to the first resonator 210. Consequently, the second resonance may be modified while keeping the first resonances unaffected. In some embodiments, the lack of thermal crosstalk between the first and second resonators 210 and 220 can have significant advantages including, but not limited to, making the control of the resonant interferometric coupler 200 simpler, and facilitating the addition of third, fourth or other resonators without creating a difficult-to-control set of interacting elements, to name a few examples.

In some other embodiments, the tuning mechanism 230 can include a cooler which can, for instance via Peltier effect, cool the second resonator 220 thereby modifying the second resonance. Other types of tuning mechanisms can be used in some other embodiments. For instance, the tuning mechanism 230 can include an electro-optical module varying the refractive index of a portion of the second resonator 220. In some embodiments, the electro-optical module can be driven in a static or in a dynamic fashion. In some other embodiments, the tuning mechanism 230 can include a source shining light or pumping electrons into the area A proximate to the second resonator 220. The light or pumped electrons can excite electrons within the second resonator and thereby change its local refractive index leading to a change in the second resonance of the second resonator. Although only the second resonator 220 is shown with a tuning mechanism, it is noted that another tuning mechanism can be provided to the first resonator 210 to modify its first resonances. In some embodiments, each resonator of the resonant interferometric coupler 200 has its own, dedicated and independent tuning mechanism.

Figure 3A:
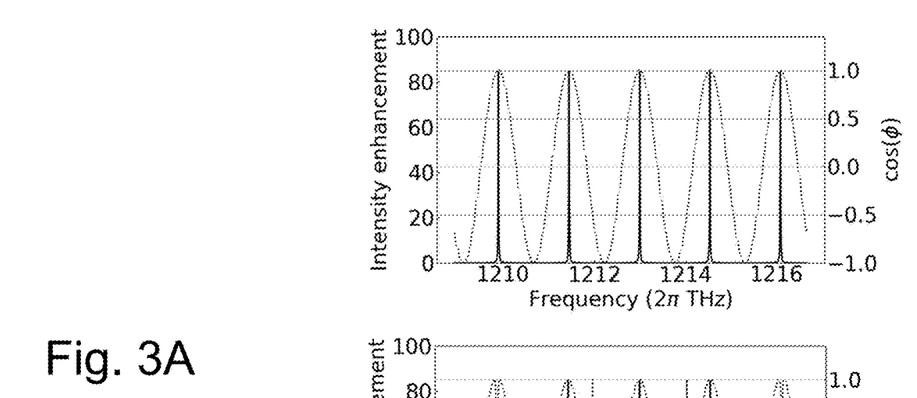
FIGS. 3A, 3B and 3C are graphs showing intensity enhancement as a function of frequency for the resonant interferometric coupler of FIG. 2 with coupling coefficients of κ=0, κ=0.2 and κ=0.8, respectively, in accordance with one or more embodiments.
Figure 3B:
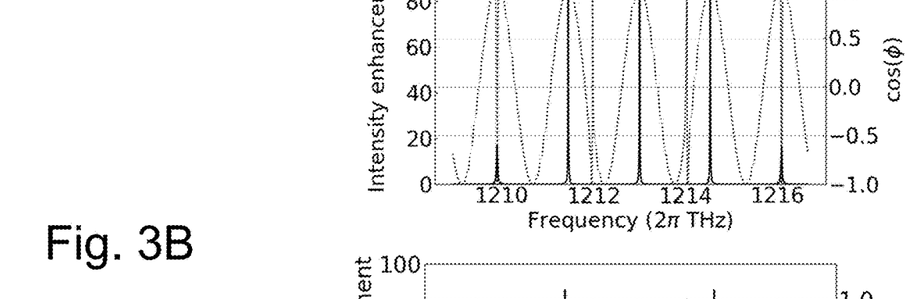
Figure 3C:
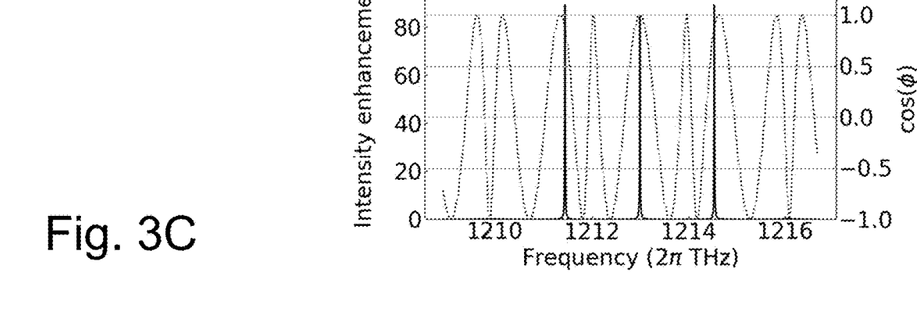

FIGS. 3A, 3B and 3C are graphs showing intensity enhancement as a function of frequency for the resonant interferometric coupler 200. In these simulations, K denotes the coupling coefficient of the second resonator 220 and more specifically of the coupling occurring at the third evanescent coupling point 222. As shown, FIG. 3A shows the intensity enhancement in a situation where κ=0, i.e., in a situation with no coupling. FIGS. 3B and 3C show the resonances in situations where κ=0.2 and κ=0.8, respectively. It is noted that as the coupling coefficient κ increases, the intensity enhancement of the resonances at 1210×2π THz and 1216×2π THz is reduced. The dotted lines represent the frequency-dependent phase shift between the first and second arm paths 216a and 216b of the interferometric coupler 200. The above-described approach can be generalized to other configurations in which the second resonator is more complicated, featuring a desired set of resonances with the proper width. Indeed, to produce the desired phase shift configuration one has to be able to control the position of the second resonances of the second resonator and their spectral widths. To this end, there are several possible configurations that can be adopted. For example, the independent control of several resonances (even in the case in which the resonances are not evenly spaced in frequency) can be obtained by using several second resonators of different sizes, each of them targeted to a specific set of resonances such as shown in FIG. 4.

Figure 4:
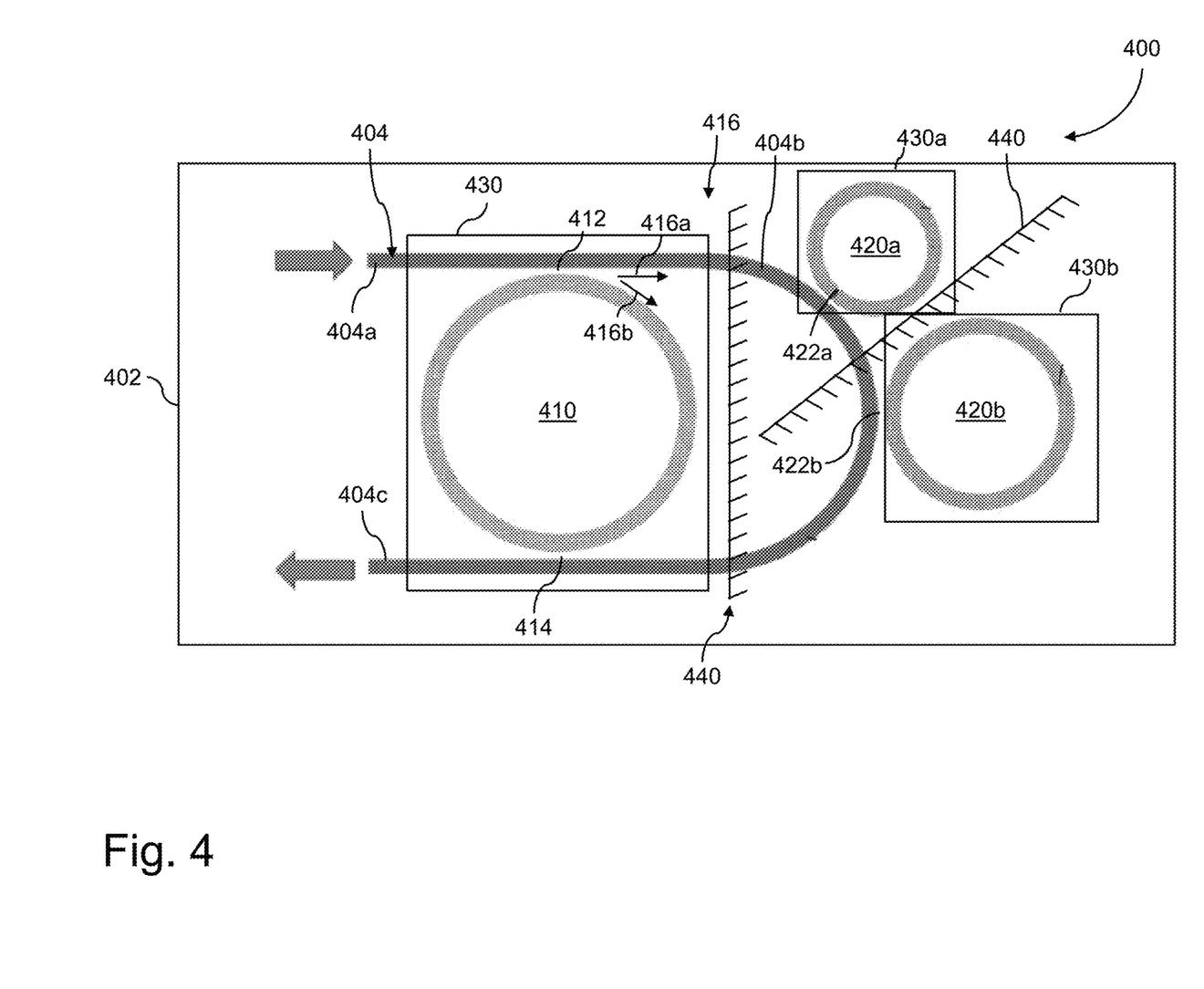
FIG. 4 is a schematic view of a third example of a resonant interferometric coupler, shown with a first resonator coupled with both second and third resonators via an interferometer, in accordance with one or more embodiments.

More specifically, FIG. 4 shows another example of a resonant interferometric coupler 400. In this embodiment, the resonant interferometric coupler 400 has a substrate 402, and a bus waveguide 404 mounted to the substrate 402. The bus waveguide 404 has in serial connection an input section 404a, a bent section 404b and an output section 404c. A first resonator 410 is mounted to the substrate 402. As shown, the first resonator 410 has a first evanescent coupling point 412 with the input section 404a and a second evanescent coupling point 414 with the output section 404c. The resonant interferometric coupler 400 has an interferometer 416 having a first arm path 416a extending along the bent section 404b and a second arm path 416b extending along the first resonator 410 between the first and second evanescent coupling points 412 and 414. As depicted, second and third resonators 420a and 420b are mounted to the substrate 402. As shown, the second and third resonators 420a and 420b have third and fourth evanescent coupling points 422a and 422b with the bent section 404b. The second resonator 420a has at least a second resonance and the third resonator 420b has at least a third resonance. Typically, the second and third resonances are spectrally spaced apart from one another. However, they may at least partially overlap with one another in some embodiments. Each of the second and third resonances at least partially overlap with one or more of the first resonances of the first resonator 410. In some embodiments, the second and third resonators 420a and 420b can have dedicated tuning mechanisms 430a and 430b operated independently from one another. More specifically, the second resonator 420a can have a first tuning mechanism 430a operable to modify the second resonance and the third resonator 420b can have a second tuning mechanism 430b operable to modify the third resonance, with the first and second tuning mechanisms 430a and 430b being independent from one another. Moreover, in embodiments where the first and second tuning mechanisms 430a and 430b involves heater(s), one or more thermal barriers 440 can be provided to thermally insulate the first, second and third resonators 410, 420a and 420b from one another. In these embodiments, the thermal barriers 440 can be provided in the form of wall partitions separating the resonators, spacing distances distancing the resonators from one another, and the like. In the illustrated embodiment, the first resonator 410 is provided with its own dedicated tuning mechanism 430 as well.

Figure 5:
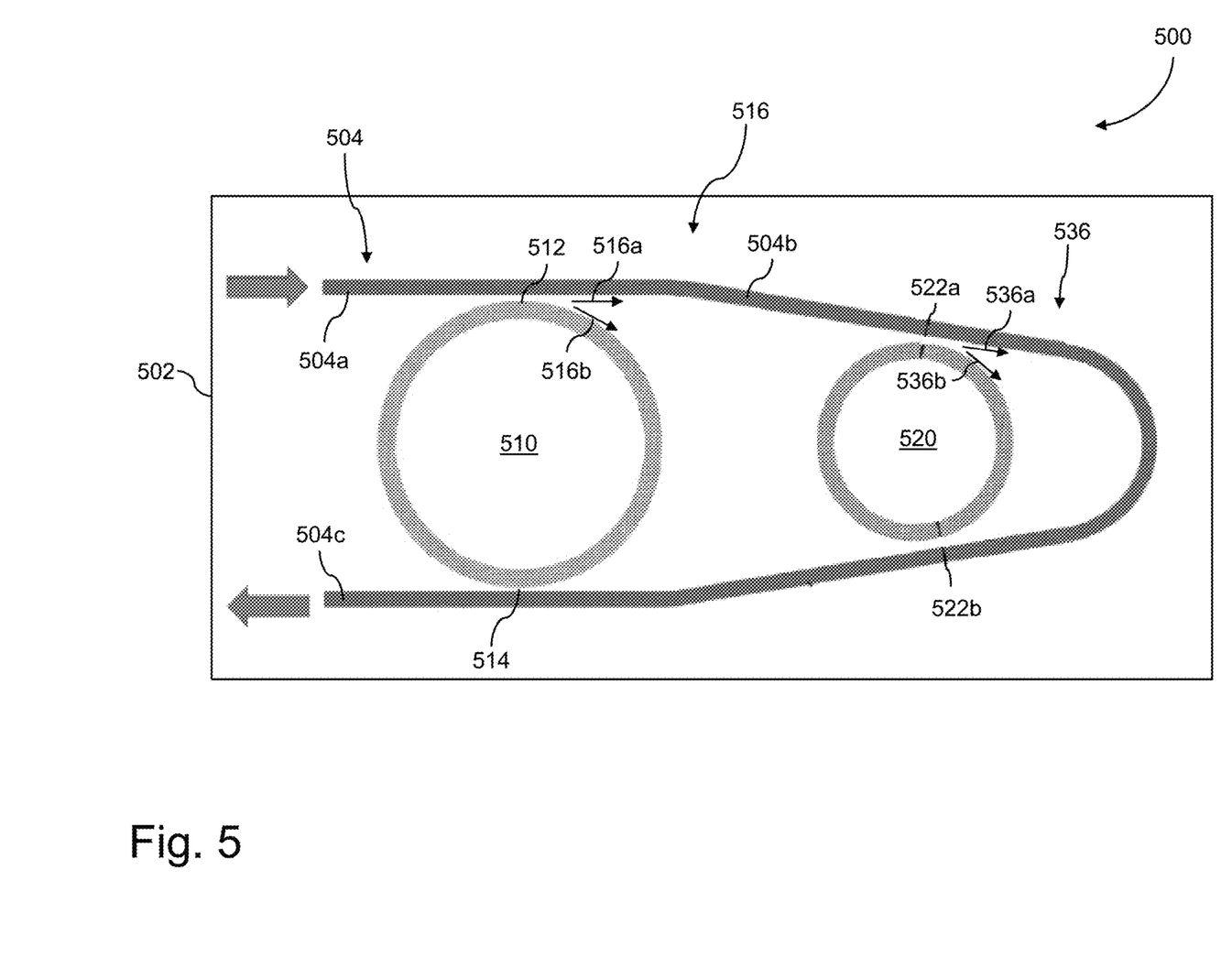
FIG. 5 is a schematic view of a fourth example of a resonant interferometric coupler, with first and second resonators coupled with one another via an interferometer, the first and second resonators each having two evanescent coupling points to a bus waveguide, in accordance with one or more embodiments.

In embodiments where adjusting a spectral width of the second resonator is desired, embodiments such as the one shown in FIG. 5 can be used. More specifically, the spectral width of the second resonator can be adjusted by selecting the distance between the second resonator and the bus waveguide and also by connecting the second resonator using two different evanescent coupling points, thereby creating a second interferometer. It was found that this configuration can allow the overcoming of limits set by evanescent coupling for some material platforms and wavelength ranges. For instance, such a configuration may be advantageous using material platforms having lower coupling efficiencies.

FIG. 5 shows another example of a resonant interferometric coupler 500. In this embodiment, the resonant interferometric coupler 500 has a substrate 502, a bus waveguide 504 mounted to the substrate. The bus waveguide 504 has in serial connection an input section 504a, a bent section 504b and an output section 504c. A first resonator 510 is mounted to the substrate 502. As shown, the first resonator 510 has a first evanescent coupling point 512 with the input section 504a and a second evanescent coupling point 514 with the output section 504c. The resonant interferometric coupler 500 has a first interferometer 516 having a first arm path 516a extending along the bent section 504b and a second arm path 516b extending along the first resonator 510 between the first and second evanescent coupling points 512 and 514. The resonant interferometric coupler 500 is provided with a second resonator 520 which has third and fourth evanescent coupling points 522a and 522b with the bent section 504b of the bus waveguide 504. As shown, the fourth evanescent coupling point 522b is downstream from the third evanescent coupling point 522a along the bent section 504b of the bus waveguide 504. As shown, the second resonator 520 is positioned within the given perimeter formed by the bent waveguide 504 and the second arm path 516b along the first resonator 510. In other embodiments, the second resonator 520 may be positioned outside of the given perimeter. For instance, in situations where the second resonator 520 is provided in the form of a ring resonator, the bus waveguide 504 may have curvilinear sections, including at least a concave section, being coupled to the second resonator 520 at the third and fourth evanescent coupling points 522a and 522b. In some other embodiments, the second resonator 520 can be provided in the form of a photonic crystal resonator positioned within and/or outside the given perimeter. Such a configuration can lead to a second interferometer 536 having a third arm path 536a between the third and fourth evanescent coupling points 522a and 522b along the bent section 504b and a fourth arm path 522a and 522b between the third and fourth evanescent coupling points 522a and 522b along the second resonator 520.

Figure 6:
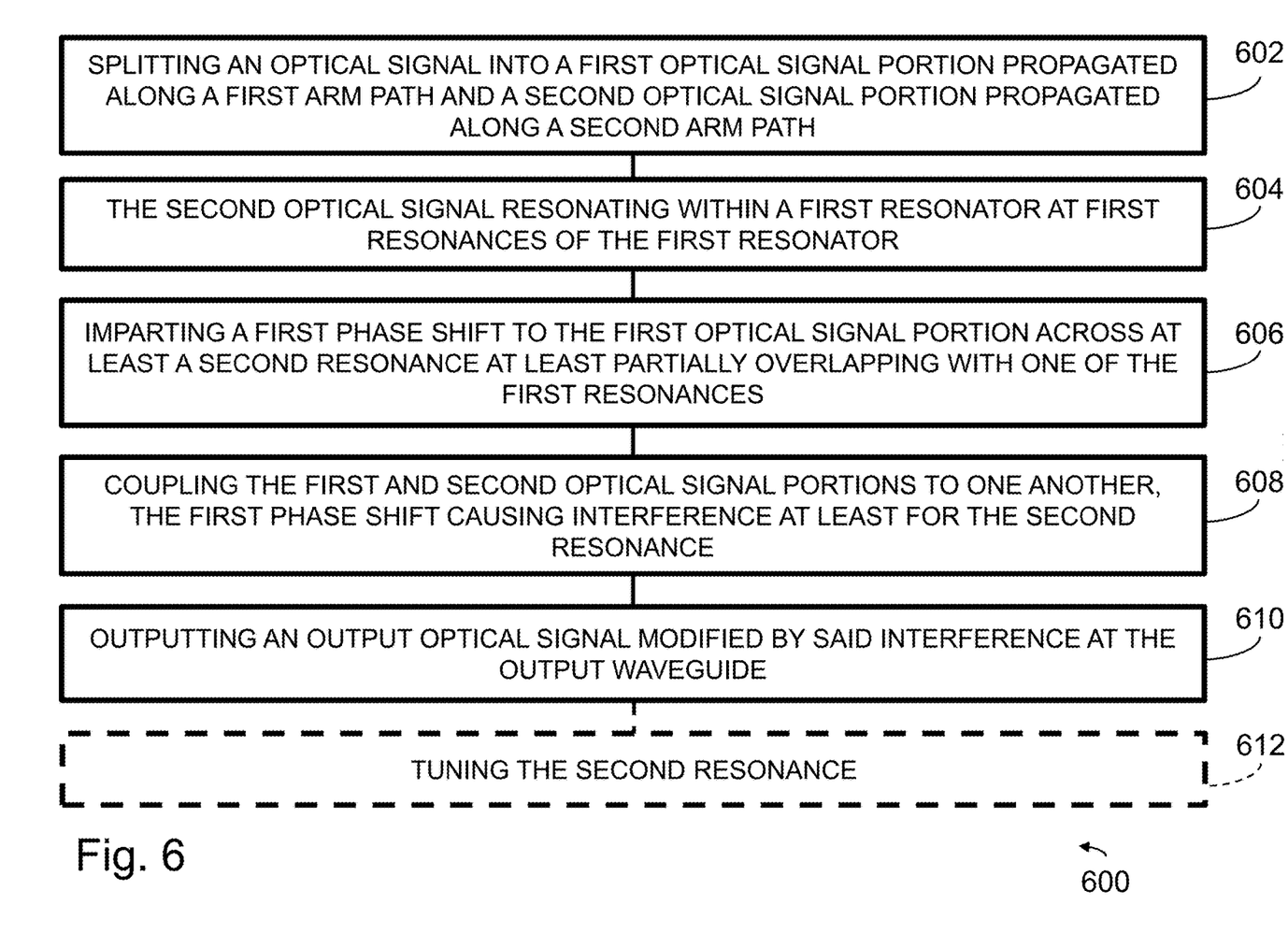
FIG. 6 is a flow chart of an example of a method of modifying an optical signal using a resonant interferometric coupler, in accordance with one or more embodiments.

Referring now to FIG. 6, there is described a method 600 of modifying an optical signal using a resonant interferometric coupler such as those described above. For instance, the resonant interferometric coupler has a bus waveguide having in serial connection an input section, a bent section and an output section, a first resonator being evanescently coupled with the input section at a first coupling point and evanescently coupled with the output section at a second coupling point, an interferometer having a first arm path extending along the bent section between the first and second coupling points, and a second arm path extending along the first resonator between the first and second coupling points. The resonant interferometric coupler used in the method 600 can be performed using any one of the resonant interferometric couplers 100, 200, 400 or 500 described above or any other suitable coupler.

The method 600 has a step 602 of splitting an optical signal into a first optical signal portion propagated along the first arm path and a second optical signal portion propagated along the second arm path. At step 604, the second optical signal resonates within the first resonator at the first resonances of the first resonator. At step 606, a first phase shift is imparted to the first optical signal portion across a second resonance at least partially overlapping with one of the first resonances. At step 608, the first and second optical signal portions are coupled to one another at the second coupling point, thereby causing constructive or destructive interference at least for the second resonance. At step 610, an output optical signal modified by the interference of the fourth step is outputted at the output waveguide.

In some embodiments, the method 600 has a step 612 of tuning the second resonance of the second resonator. The step 612 of tuning can include spectrally shifting the second resonance, spectrally narrowing the second resonance and/or spectrally broadening the second resonance. In some embodiments, the step 612 of tuning can include a step of heating at least an area of the second resonator. The area heated can be proximate to the resonator. For instance, the area heated can be part of the second resonator or part of the substrate on which rests the second resonator. In these embodiments, the method 600 can include a step of thermally insulating the first and second resonators from one another. In some embodiments, the step 612 of tuning includes modifying a refractive index of the bent section, modifying a refractive index of the second resonator or a combination thereof. It is noted that the step 612 of tuning the second resonance is optional in some embodiments and can be omitted.

As can be understood, the examples described above and illustrated are intended to be exemplary only. For instance, a single resonant interferometric coupler can include one or more substrates onto which the photonic components are mounted. For instance, the bus waveguide can extend over two distinct substrates, with the first resonator on a first substrate and the second resonator on a second substrate. It is understood that evanescent coupling is meant to encompass side coupling in some embodiments. Accordingly, the evanescent coupling points may be equivalently referred to as side coupling points in some embodiments. It is noted that the resonant interferometric coupler(s) and associated method(s) presented herein can be used in a number of different fields including, but not limited to, quantum and classical nonlinear optics (e.g., modifying a squeezed light signal, generation of non-classical light, frequency conversion), telecom/datacom (e.g., optical filtering, optical switching), laser development (e.g., Q-switch systems, optical parametric oscillator (OPO), optical parametric amplification (OPA)), optical sensing (e.g., precision measuring the change of the effective refractive index in the second resonator through the transmission of the first resonator), and the like. The scope is indicated by the appended claims.

What is claimed is:

1. A resonant interferometric coupler comprising:
   a substrate;
   a bus waveguide mounted to the substrate, the bus waveguide having in serial connection an input section, a bent section and an output section;
   a first resonator mounted to the substrate and having a first evanescent coupling point with the input section and a second evanescent coupling point with the output section, the first resonator having first resonances;
   an interferometer having a first arm path extending along the bent section between the first and second evanescent coupling points, and a second arm path extending along the first resonator between the first and second evanescent coupling points; and
   a second resonator being mounted to the substrate and having a third evanescent coupling point with the bent section, the second resonator having at least a second resonance overlapping with at least one of the first resonances and across which a first phase shift is imparted, the first phase shift causing interference at the second evanescent coupling point.

2. The resonant interferometric coupler of claim 1 further comprising a tuning mechanism mounted to the substrate, the tuning mechanism being operable to modify the second resonance of the second resonator.

3. The resonant interferometric coupler of claim 2 wherein the tuning mechanism includes a heater configured for heating at least an area of the second resonator.

4. The resonant interferometric coupler of claim 3 further comprising a thermal barrier thermally insulating the first and second resonators from one another.

5. The resonant interferometric coupler of claim 1 further comprising at least a third resonator mounted to the substrate and adjacent to the second resonator, the third resonator having at least a fourth coupling point with the bent section and at least a third resonance overlapping with at least one of the first resonances and across which a second phase shift is imparted.

6. The resonant interferometric coupler of claim 5 wherein the third resonance is spectrally spaced apart from the second resonance.

7. The resonant interferometric coupler of claim 1 wherein the second resonator has a fourth coupling point with the bent section downstream from the third coupling point.

8. The resonant interferometric coupler of claim 1 wherein at least one of the first resonator and the second resonator is a ring resonator.

9. The resonant interferometric coupler of claim 1 wherein the second resonance is twice as broad as the one of the first resonances.

10. The resonant interferometric coupler of claim 1 wherein the substrate is made of silicon, the bus waveguide consists of one of silicon-oxide and silicon-nitride, and the second resonance has a full width at half maximum of about 2 nm.

11. The resonant interferometric coupler of claim 1 wherein the first phase shift imparted by the second resonator is frequency dependent.

12. A method of modifying an optical signal using a resonant interferometric coupler, the resonant interferometric coupler having a bus waveguide having in serial connection an input section, a bent section and an output section, a first resonator being evanescently coupled with the input section at a first coupling point and evanescently coupled with the output section at a second coupling point, an interferometer having a first arm path extending along the bent section between the first and second coupling points, and a second arm path extending along the first resonator between the first and second coupling points, the method comprising:

splitting an optical signal into a first optical signal portion propagated along the first arm path and a second optical signal portion propagated along the second arm path;

the second optical signal resonating within the first resonator at first resonances of the first resonator;

using a second resonator being evanescently coupled to the bent section at a third coupling point, imparting a first phase shift to the first optical signal portion across at least a second resonance at least partially overlapping with one of the first resonances; and at the second coupling point downstream from the third coupling point, coupling the first and second optical signal portions to one another, the first phase shift causing interference at least for the second resonance; and outputting an output optical signal modified by said interference at the output waveguide.

13. The method of claim 12 further comprising tuning the second resonance of the second resonator.

14. The method of claim 13 wherein said tuning includes at least one of spectrally shifting the second resonance, narrowing the second resonance and broadening the second resonance.

15. The method of claim 13 wherein said tuning includes heating at least an area of the second resonator.

16. The method of claim 13 wherein said tuning includes modifying a refractive index of the second resonator.

17. The method of claim 12 further comprising thermally insulating the first and second resonators from one another.

18. The method of claim 12 wherein the second resonance is twice as broad as the one of the first resonances.

19. The method of claim 12 wherein the optical signal has optical power distribution within a telecommunication band, and the second resonance has a full width at half maximum of about 2 nm.

20. The method of claim 12 wherein the first phase shift imparted by the second resonator is frequency dependent.

* * * * *